(12) United States Patent
Lorenz

(10) Patent No.: US 6,201,126 B1
(45) Date of Patent: *Mar. 13, 2001

(54) ISOINDOLENINEAMIDE DYESTUFFS

(75) Inventor: Manfred Lorenz, Köln (DE)

(73) Assignee: Bayer Aktiengesellschaft (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/867,564

(22) Filed: Jun. 2, 1997

(30) Foreign Application Priority Data

Jun. 4, 1996 (DE) ............................... 196 22 356

(51) Int. Cl.[7] ..................... C07D 403/02; C07D 413/02; C07D 417/02; C09B 67/20
(52) U.S. Cl. ...................... 548/159; 548/161; 548/173; 548/217; 548/222; 548/305.1; 548/306.1; 548/953; 548/954; 546/201; 546/270.1; 546/270.7; 546/271.7; 546/273.4; 544/135; 544/143; 544/153; 540/602; 540/603; 540/607; 8/571; 8/572; 8/573; 8/574
(58) Field of Search ..................... 548/159, 161, 548/173, 198, 217, 222, 234, 237, 238, 239, 305.1, 306.1

(56) References Cited

U.S. PATENT DOCUMENTS

| | | | |
|---|---|---|---|
| 3,646,033 | 2/1972 | Leister et al. | 49/38 |
| 3,794,659 | * 2/1974 | Leister et al. | 260/305 |
| 3,985,763 | 10/1976 | Harnisch et al. | 260/307 |
| 4,051,099 | 9/1977 | Crone | 260/40 |
| 5,646,290 | 7/1997 | Lorenz et al. | 548/159 |

FOREIGN PATENT DOCUMENTS

| | | |
|---|---|---|
| 2041999 | 3/1972 | (DE) . |
| 2 065 522 | 3/1974 | (DE) . |
| 0510436 | 10/1992 | (EP) . |
| 6840289 | 11/1995 | (EP) . |
| 1470022 | 4/1967 | (FR) . |
| 1537299 | 9/1967 | (FR) . |
| 0 307 008 | 11/1976 | (FR) . |

OTHER PUBLICATIONS

F. Baumann, et al., Isoindelenine als Zwischenprodukte der Phtalocyanin–Synthese, Angewandte Chemie, 68, No. 4, pp. 133–168, (1956).

I. Chambrier, et al., Reaction of Phthalonitrile with Alkoxide Ions, J. Chem. Research, (S), pp. 322–323, (1990).

F. Baumann, et al., Isoindolenine als Zwischenprodukte der Phthalocyanin–Synthese, Angewandte Chemie, 68, No. 4, pp. 133–168, (1956).

I. Chambrier, et al., Reaction of Phthalonitrile with Alkoxide Ions, J. Chem. Research, (S), pp. 322–323, (1990).

* cited by examiner

*Primary Examiner*—Johann Richter
*Assistant Examiner*—Jane C. Oswecki
(74) *Attorney, Agent, or Firm*—Connolly, Dove, Lodge & Hutz LLP

(57) ABSTRACT

Compounds of the formula (I)

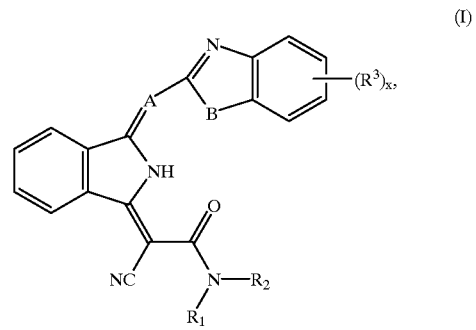

in which

A represents N or a cyanomethylene radical,

B represents S, O or NH and $R^1$, $R^2$, $R^3$ and x have the meaning given in the description, are highly suitable for dyeing and printing high-molecular-weight materials, in particular automotive cover fabrics.

16 Claims, No Drawings

ISOINDOLENINEAMIDE DYESTUFFS

The invention relates to isoindolenineamide dyestuffs, processes for their preparation and their use for dyeing hydrophobic synthetic materials.

DE-A 1,670,748 already discloses isoindolenineamide dyestuffs similar to those of the formula (I), but those dyestuffs still have disadvantages in practical application. Disadvantages in practical application are understood to mean, for example, poor exhaustion or build-up properties in polyester dyeing, or poor light fastness, in particular hot light fastness, i.e. properties which are required when textiles dyed with these dyestuffs are used in the automobile sector.

Isoindolenineamides have been found which have the formula I or correspond to tautomeric forms thereof

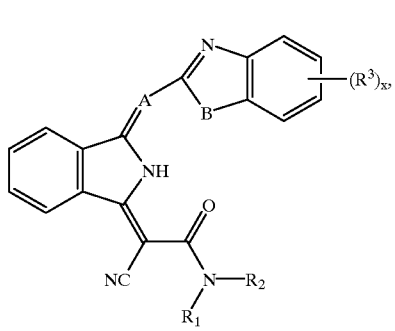

(I)

in which

A represents N or a cyanomethylene radical,

B represents S, O or NH, $R_1$ represents a saturated or unsaturated aliphatic or cycloaliphatic radical having 1 to 12 C atoms, in particular 1 to 10 C atoms, which is uninterrupted or interrupted by one or more oxygen atoms and/or is unsubstituted or substituted by one or more identical or different substituents selected from the group consisting of alkoxy, acyloxy, halogen, CN, aryl, in particular phenyl, $R^2$ denotes hydrogen or aryl or adopts one of the meanings given for $R^1$, $R^1$ and $R^2$ being identical or different, or $R^1$ and $R^2$, together with the N atom to which they are bonded, form a heterocyclic ring, $R_3$ denotes halogen, in particular Cl, F and Br, $C_1$–$C_4$-alkyl, a saturated or unsaturated aliphatic alkoxy radical having 1 to 4 C atoms, in particular $C_1$–$C_4$-alkoxy, which is unsubstituted or substituted by $C_1$–$C_4$-alkoxy, CN or $NO_2$, and x denotes a number from 0 to 4.

Examples of suitable radicals $R^1$ and $R^2$ are methyl, ethyl, n-propyl, allyl, n-butyl, n-pentyl, n-hexyl, n-heptyl, n-octyl, n-decyl, n-dodedyl, 2-acetoxy-ethyl, 2-propionyloxy-ethyl, 2-acetoxy-propyl, 2-methoxy-ethyl, 2-ethoxy-ethyl, 2-butoxy-ethyl, 3-methoxy-propyl, 3-ethoxy-propyl, 3-butoxy-propyl, 3-allyloxy-propyl, 2-ethyl-hexyl, 3-(2-ethyl-hexyloxy)-propyl, phenyl, benzyl and cyclohexyl. Suitable branched radicals $R^1$ are preferably those having a methyl side chain, such as, for example, iso-butyl or iso-pentyl. Examples of preferred heterocyclic rings are aliphatic 5-, 6- or 7-membered rings.

Preferred compounds of the formula I are those in which radicals $R^1$ and $R^2$, together with the N atom to which they are bonded, form the secondary amines listed below: diethylamine, dipropylamine, diisopropylamine, dibutylamine, diisobutylamine, methyl-butyl-amine, methyl-(2-acetoxyethyl)-amine, ethyl-(2-acetoxyethyl)-amine, methyl-(2-acetoxypropyl)-amine, bis-(2-acetoxyethyl)-amine, bis-(2-acetoxypropyl)-amine, pyrrolidine, piperidine, 2-methylpiperidine, 4-methylpiperidine, hexamethyleneimine, morpholine, benzyl-methylamine and cyclohexyl-methylamine.

Preferred radicals $R^3$ are chlorine, methyl, methoxy and ethoxy.

Particularly preferred dyestuffs of the formula (I) are those in which x represents 0 or 1.

Very particularly preferred dyestuffs are those having the formula (II) or those corresponding to tautomeric forms thereof

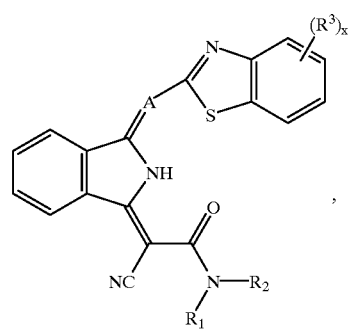

(II)

in which

A and $R^1$ –$R^3$ have the above meaning, x preferably representing 0.

Preferred isoindolenineamides of the formula (I) are those in which A represents N.

Although all the formulae described in this application only represent one tautomeric form of the compound(s) in question, if several forms are possible, they are representative of all the possible tautomeric forms.

Furthermore, an E or a Z isomer described by a formula includes also the other isomer in each case, especially with respect to exocyclic double bond(s). This applies unless expressly stated otherwise.

Furthermore, the invention also provides a process for preparing compounds of the formula (I), which is characterized in that a compound of the formula (III)

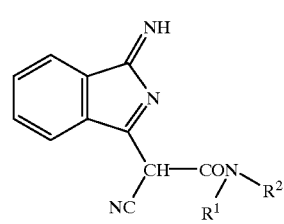

(III)

is condensed with a compound of the formula (IV)

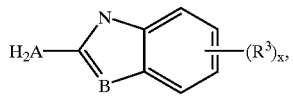
(IV)

which is present in the form of the compounds of the formulae IVa or IVb or tautomeric forms thereof

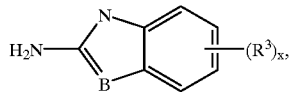
(IVa)

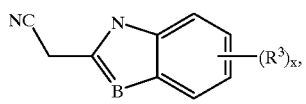
(IVb)

or an amainoisoindolenine of the formula (V)

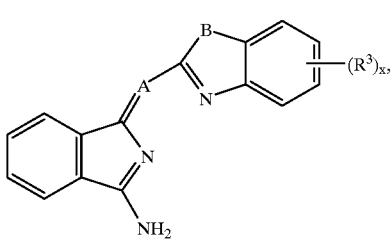
(V)

is condensed with a cyanoacetamide of the formula (VI)

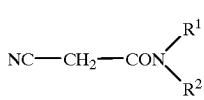
(VI)

where $R^1, R^2, R^3, A, B$ and x have the abovementioned meaning.

Individual examples of the compounds of the formula (III) can be represented by the formulae (Va) and (Vb) or tautomeric formulae thereof.

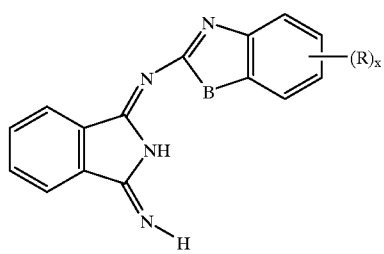
(Va)

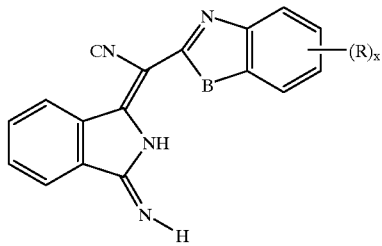
(Vb)

Compounds of the formula (III) can be prepared by methods similar to those of the analogous compounds described in DE-A-1,670,748 or in DE-A-2,041,999.

Particularly preferred compounds of the formula (III) are those in which $R^2$ is different from hydrogen. Compounds of this type are novel.

In a process for their preparation, amino-imino-isoindoline is reacted with a cyanoacetamide of the formula (VI), the reaction being preferably carried out in a polar, in particular a hydrophilic, organic solvent. Water and mixtures of water with solvents are also suitable. Examples of polar solvents include amides, such as dimethylformamide, formamide, dimethylacetamide, N-methylpyrrolidone, furthermore dimethyl sulphoxide, acetonitrile, acetic acid or, preferably, alcohols, such as, for example, methanol, ethanol, propanol, isopropanol, butanol, methyl glycol or ethyl glycol. In addition, mixtures of these solvents can also be used.

The required reaction temperatures are between about 0 and 100° C., preferably between 20 and 80° C.

In another process for preparing compounds of the formula (III), first an alcohol is subjected to an addition reaction with a phthalodinitrile in the presence of an alkoxide as catalyst to give an intermediate (see I. Chembrier and M. J. Cook, J. Chem. Research, 322 (1990) and F. Baumann et al., Angew. Chem., 68, 133 (1956) and EP 510,436). This intermediate can then be reacted further, without prior isolation, with a cyanoacetamide of the formula (VI), it being possible to add organic acids in order to accelerate the reaction. Suitable alcohols are in particular lower alcohols, such as, for example, methanol, ethanol, propanol and isopropanol. The required reaction temperatures are preferably between 20 and 80° C.

The compounds of the formula (III) can be isolated as intermediates. However, they can also be subjected to condensation directly from the reaction batch, if desired after addition of further solvent and/or water.

Compounds of the formulae (Va) and (Vb) are also described in DE-A-1,670,748.

In a preferred embodiment of the process according to the invention for preparing compounds of the formula (I), condensation is carried out in water, in a polar, in particular a hydrophilic, organic solvent or in mixtures thereof.

Examples of polar solvents include amides, such as dimethylformamide, formamide, dimethylacetamide, N-methylpyrrolidone, ftuthermore dimethyl sulphoxide, acetonitrile, acetic acid or, preferably, alcohols, such as, for example, methanol, ethanol, butanol, methyl glycol or ethyl glycol. In addition, mixtures of these solvents can also be used.

Particularly preferably, the process according to the invention is carried out in the presence of an organic acid. This leads to acceleration of the reaction, often also resulting in higher yields and higher purity. Examples of suitable organic acids are lower aliphatic, saturated or unsaturated mono- or dicarboxylic acids, such as, for example, formic acid, acetic acid, propionic acid, butyric acid, oxalic acid, fumaric acid, maleic acid, succinic acid, glutaric acid, adipic acid, but also aromatic acids, such as, for example, benzoic acid, phthalic acid, phenylacetic acid, isophthalic acid and terephthalic acid. The acids are added in amounts of 0.2–3 mole equivalents, preferably 1–2 mole equivalents. However, higher amounts of acid can also be used, preferably in those cases where the acid is also used as solvent, for example acetic acid.

The components can be used in equivalent amounts or in excess.

The reaction temperatures for the process according to the invention are preferably 10 to 140° C., in particular 20 to 120° C., and can be varied depending on the reactivity of the starting materials.

The reaction of compounds of the formula (III) with compounds of the formula (IVa) is preferably carried out at a temperature of 90 to 140° C. and preferably in an organic solvent which boils at or above the reaction temperature.

The reaction of compounds of the formula (III) with compounds of the formula (IVb) and of compounds of the formula (Va) or (Vb) with compounds of the formula (VI) is preferably carried out at a temperature of 10 to 100° C., condensation being preferably carried out in water or in a mixture of water and an organic solvent.

Carrying out the reaction in water or in reaction media containing water facilitates isolation of the dyestuffs and avoids work-up of fairly large amounts of organic solvents. In this process variant, the reaction is preferably carried out at water contents of 20 to 100%, in particular of 50 to 100%, relative to the amount of reaction medium used.

If the reaction medium used is water or a predominantly aqueous medium, it is advantageous to add surface-active substances, such as surfactants, dispersants, emulsifiers and wetting agents. Suitable agents include the known non-ionic, anionic and cationic auxiliaries. Examples of these compounds include salts of alkylbenzenesulphonic acids, alkylphenolsulphonic acids, alkylnaphthalenesulphonic acids, condensation products of phenolsulphonic acids, formaldehyde and urea, lignosulphonates, ethylene oxide and propylene oxide adducts with alkanols, alkanediols, phenols, carboxylic acids, amines, carboxamides and sulphuric monoesters thereof, it also being possible to use mixtures of these compounds. However, particular preference is given to lignosulphonates, such as Reax kraft lignins from Westvaco or Ufoxane sulphite lignins from Borregaard.

The invention furthermore relates to the use of compounds of the formula (I) for dyeing fully synthetic or semisynthetic high-molecular-weight materials. They are suitable in particular for dyeing or printing synthetic fibre materials, in particular those made of aromatic polyesters and/or cellulose acetates. The resulting dyeings have high colour strength and exhibit superior light fastness, in particular high hot light fastness, which makes them particularly suitable for dyeing and printing textile materials for automobiles and for dyeing microfibres. They are also suitable for thermal transfer printing on textile and non-textile substrates, for example by the D2T2 dye diffusion thermal transfer method for image recording. Furthermore, the dyestuffs can be used for the mass coloration of plastics, for example of polyethylene, polypropylene, styrene, polycarbonates, and of plastic blends, such as, for example, ABS. Some of the dyestuffs, in particular those in which A represents a cyanomethylene radical, exhibit fluorescence, which makes them suitable for use as fluorescent dyestuffs.

Polyester textile materials can be dyed with the dyestuffs according to the invention by the procedure used for spin-dyeing, but preferably they are dyed from an aqueous suspension. To this end, the dyestuffs are converted into dyestuff preparations by a generally known method, for example by milling in water in the presence of dispersants and/or fillers. The optionally vacuum-dried or spray-dried preparations can be used, after addition of water, for dyeing, padding or printing in a short or long liquor.

During preparation or in order to improve the degree of dispersion, a surface-active agent or a mixture of such auxiliaries can be added during synthesis or during milling. The size of the dyestuff particles can of course be influenced as desired and adjusted to the required value by the milling treatment, for example by wet milling in a pearl mill, either during synthesis or following synthesis.

Suitable dispersants are those of the anionic or non-anionic type. Apart from dispersants from one or the other group, it is also possible to use mixtures of dispersants, which are primarily understood to mean mixtures of non-ionic and anionic dispersants, since anionic and cationic dispersants when mixed with one another lead to the formation of precipitates.

Of the anionic dispersants, in particular condensation products of aromatic sulphonic acids with formaldehyde, such as condensation products of formaldehyde and alkyl-naphthalenesulphonic acids or of formaldehyde, naphthalenesulphonic acids and benzenesulphonic acids, condensation products of substituted or unsubstituted phenol with formaldehyde and sodium bisulphite have proven to be effective.

Other suitable compounds are in particular lignosulphonates, for example those obtained by the sulphite or kraft process. These are preferably products which are partially hydrolyzed, oxidized, propoxylated or desulphonated and are fractionated by known methods, for example by molecular weight or by degree of sulphonation. Mixtures of sulphite lignins and kraft lignosulphonates are also highly effective.

Particularly suitable lignosulphonates are those having an average molecular weight between 1000 and 100,000, an active lignosulphonate content of at least 80% and, preferably, a low polyvalent cation content.

The degree of sulphonation can vary within a wide range.

Examples of non-ionic dispersants or emulsifiers include reaction products of alkylene oxides with alkylatable compounds, such as, for example, fatty alcohols, fatty amines, fatty acids, phenols, alkylphenols, arylalkylphenols, and carboxamides.

These can be, for example, ethylene oxide adducts from the class of ethylene oxide reaction products with:
a) saturated and/or unsaturated fatty alcohols having 6 to 20 C atoms, or
b) alkylphenols having 4 to 12 C atoms in the alkyl radical, or
c) saturated and/or unsaturated fatty amines having 14 to 20 C atoms, or
d) saturated and/or unsaturated fatty acids having 14 to 20 C atoms, or
e) hydrogenated and/or non-hydrogenated resin acids.

Individual ethylene oxide adducts include:
a) reaction products of saturated and/or unsaturated fatty alcohols having 6 to 20 C atoms with 5 to 30 mol of ethylene oxide
b) reaction products of alkylphenols having 4 to 12 C atoms with 5 to 20 mol of ethylene oxide c) reaction products of saturated and/or unsaturated fatty amines having 14 to 20 C atoms with 5 to 20 mol of ethylene oxide d) reaction products of saturated and/or unsaturated fatty acids having 14 to 20 C atoms with 5 to 20 mol of ethylene oxide.

Further preferred dispersants are alkoxylated styrene/phenol condensation products, which are optionally used in a mixture with their inorganic esters which are obtained by reacting the alkoxylated styrene/phenol condensation product with inorganic acids, such as, for example, sulphamic acid.

Mixtures of dyestuffs of the formula (1) are also suitable, in particular for dyeing polyester, these mixtures possibly resulting in improved exhaustion and build-up properties of the dyestuffs and in improved dispersibility.

The novel dyestuff mixtures can be prepared by various methods:

1. by mixing the separately prepared and finished individual dyestuff components,
2. by joint finishing of the separately prepared individual components,
3. for example by joint synthesis of mixtures of dyestuffs of the formula (I) in which x represents 0 or 1 and of dyestuffs of the formula (II) from mixtures of different precursors.

Mixing of the dyestuffs is advantageously carried out in suitable mills, for example ball or sand mills. However, separately finished individual dyestuffs can also be mixed by stirring them into dyeing liquors.

Mixtures of dyestuffs of the formula (I) which only differ in the radicals $R^1$ and $R^2$ are particularly suitable.

However, the dyestuffs are also highly suitable for preparing mixtures with other disperse dyestuffs in order to produce, for example, brown, grey or green hues on the fibre.

A further preferred embodiment of the present invention relates to mixtures of one or more dyestuffs of the formula (I) with one or more dyestuffs usually used for dyeing polyester fibres or polyester textile materials for automotive cover fabrics. These dyestuffs for dyeing automotive cover fabrics can be, in particular, azo, disazo, anthraquinone, nitro, naphthalimide and terephthalimide dyestuffs. Examples of particularly preferred dyestuffs for mixtures of this type are the Colour Index dyestuffs Yellow 23, 42, 51, 59, 65, 71, 86, 108, 122, 163, 182, 211, Orange 29, 30, 32, 41, 44, 45, 61, 73, Red 60, 82, 86, 91, 92, 127, 134, 138, 159, 167, 191, 202, 258, 279, 284, 302, 323, Blue 27, 54, 56, 60, 73, 77, 79, 79:1, 87, 266, 333, 361, Violet 27, 28, 57 and 95, the weight ratios of the dyestuff mixtures depending on the desired shade.

EXAMPLES

Example 1

234.7 g (1.5 mol) of 92.8% pure technical grade amino-imino-isoindolenine and 228.2 g of cyanoacetopiperidide of the formula (VI) where $R^1$ and $R^2$ together form a pentamethylene radical were stirred in 800 ml of methanol, and the resulting mixture was maintained at room temperature for 6 hours and then refluxed for 5 hours. The precipitated substance was filtered off with suction at room temperature and washed with methanol and water. After drying, 199.8 g (87.5% of theory) of a product of the formula

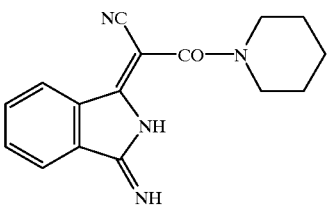

were obtained.

Example 2

28 g (0.1 mol) of the product from Example 1, 17.4 g (0.1 mol) of 2-cyano-methylbenzothiazole and 6 ml of glacial acetic acid were stirred overnight at room temperature in 100 ml of N-methyl-pyrrolidone. 50 ml of methanol were then added, and the batch was refluxed for another 3 hours. The precipitated product was filtered off with suction at room temperature and washed with water and methanol to give 29.8 g of a dyestuff of the formula:

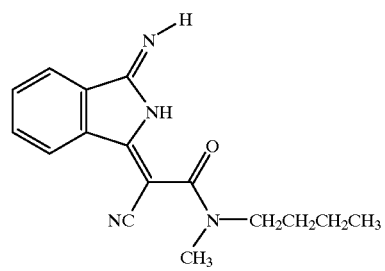

The dyestuff dyes polyester fibres in fluorescent yellow shades having excellent light fastness.

Example 3

132 ml (1.5 mol) of methyl cyanoacetate and 182 ml (1.575 mol) of methyl-butylamine were refluxed for 8 hours, and 400 ml of methanol and 234.7 g (1.5 mol) of 92.8% pure technical grade amino-imino-isoindolenine were then added. The batch is maintained at room temperature for 1 hour and then refluxed for another 5 hours. After cooling in an ice bath, the precipitated substance was filtered off with suction and washed with ice-cold methanol and water. After drying, 325 g (76.9% of theory) of a product of the following formula

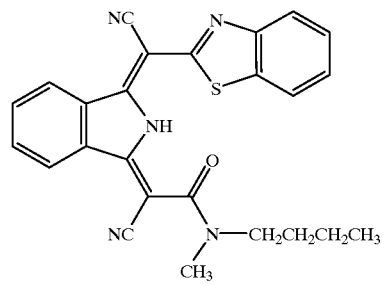

were obtained.

Example 4

28.2 g (0.1 mol) of the product from Example 3, 17.4 g (0.1 mol) of 2-cyanomethlybenzothiazole, 100 ml of glacial acetic acid and 50 ml of water were stirred at room temperature for 2 hours and at 50° C. for another 4 hours. The precipitated product was filtered off with suction at room temperature and washed with water and methanol to give 32.5 g of a dyestuff of the formula:

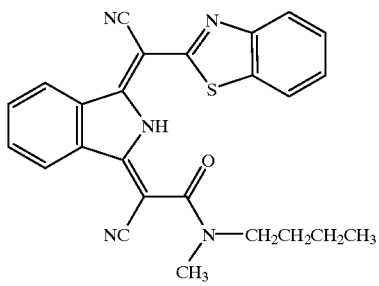

The dyestuff dyes polyester fibres in fluorescent yellow shades likewise having excellent light fastness.

Example 5

The procedure of Example 4 was repeated, except that 2-cyanomethylbenzimidazole was used instead of 2-cyanomethylbenzothiazole, to give 34.3 g of the dyestuff of the formula:

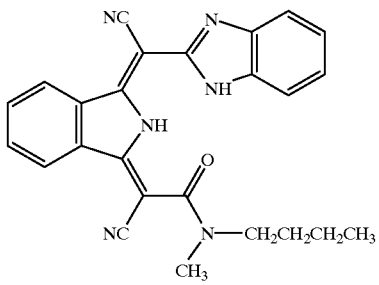

The dyestuff likewise dyes polyester fibres in yellow shades having excellent light fastness.

Example 6

28.2 g (0.1 mol) of the substance from Example 3, 17 g (0.11 mol) of 2-aminobenzothiazole, 6 ml of glacial acetic acid and 150 ml of n-butanol were refluxed for 7 hours. After cooling to room temperature, the precipitated dyestuff was filtered off with suction and washed with methanol and water to give 26.7 g of a dyestuff of the following formula:

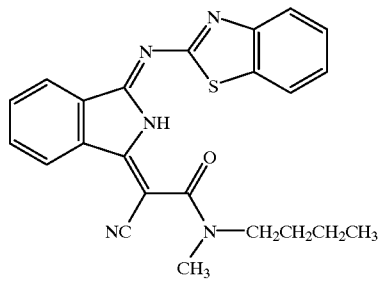

This dyestuff dyes polyester fibres in greenish yellow shades likewise having excellent fastness properties.

Example 7

The procedure of Example 3 was repeated, except that (2-hydroxyethyl)-methylamine was used instead of methylbutylamine, to give a product of the formula:

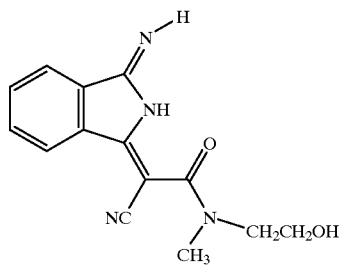

in comparable yield.

Example 8

27 g (0.1 mol) of the product from Example 7 were reacted by the procedure of Example 6 with 2-aminobenzothiazole, and the resulting product was isolated. The dried substance was heated in 150 ml of glacial acetic acid and 12 ml of acetic anhydride at 80° C. for 5 hours. After cooling to room temperature, precipitation was completed by adding a small amount of water, the precipitate was filtered off with suction and washed with water to give 19.3 g of a dyestuff of the formula:

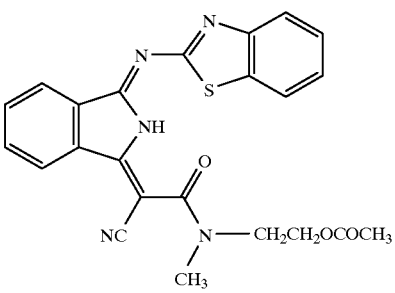

The dyestuff exhibits properties analogous to those of the dyestuff from Example 6.

Example 9

159.7 g (1.1 mol) of amino-imino-isoindolenine, 150.2 g (1.0 mol) of 2-aminobenzothiazole and 750 ml of ethanol were refluxed for 24 hours. After cooling to room temperature, the precipitated product was filtered off with suction and washed with ethanol and water. After drying at 70° C., 226.9 g (81.5% of theory) of a product of the formula:

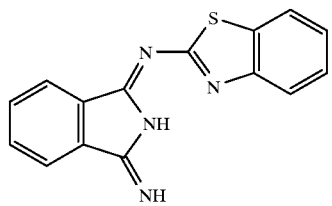

were obtained.

Example 10

27.8 g (0.1 mol) of the compound prepared in Example 9 and 16.7 g (0.1 mol) of the reaction product of methyl cyanoacetate with hexamethyleneimine were stirred in 150 ml of methyl glycol, and the resulting mixture was heated at I 10° C for 10 hours. Isolation gave 30.3 g of the dyestuff of the following formula. The dyestuff dyes polyester fibres in similar shades having comparable fastness properties to those of the dyestuff from Example 5.

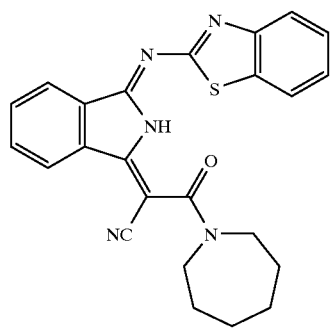

Example 11

The procedure of Example 1 was repeated, except that cyanoacetopiperidide was replaced by the analogous reaction product of methyl cyanoacetate with hexamethyleneimine, to give the product of the formula:

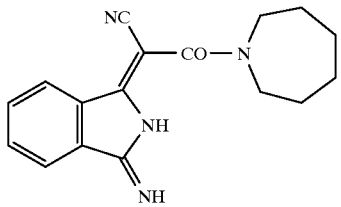

in comparable yield.

Example 12

29.4 g (0.1 mol) of the compound prepared in Example 11, 17.4 g of 2-cyanomethyl-benzothiazole and 150 ml of glacial acetic acid were stirred at room temperature for 2 hours and at 50° C for 4 hours. The product was filtered off with suction at room temperature and washed with methanol and water. In this way, 34.7 g of a dyestuff of the formula:

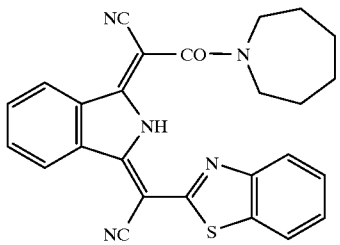

were isolated.

The dyestuff dyes polyester fibres in fluorescent yellow shades.

The dyestuffs of the table examples listed below were prepared analogously, the substituents of compound VII having the meaning given in the table.

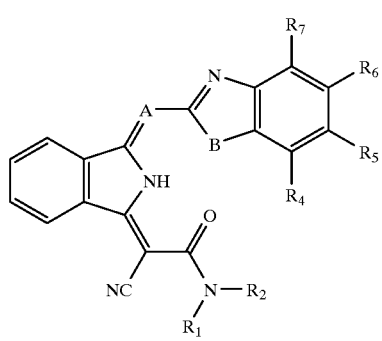

(VII)

| Example | A | B | $R_1$ | $R_2$ | $R_4$ | $R_5$ | $R_6$ | $R_7$ | Shade |
|---|---|---|---|---|---|---|---|---|---|
| 13 | =C—CN | —S— | —CH$_2$CH$_3$ | —CH$_2$CH$_3$ | H | H | H | H | fluorescent yellow |
| 14 | =C—CN | —S— | —CH$_2$CH$_3$ | —CH$_2$CH$_3$ | H | —OCH$_3$ | H | H | fluorescent orange |
| 15 | —N— | —S— | —CH$_2$CH$_3$ | —CH$_2$CH$_3$ | H | H | H | H | greenish yellow |

-continued

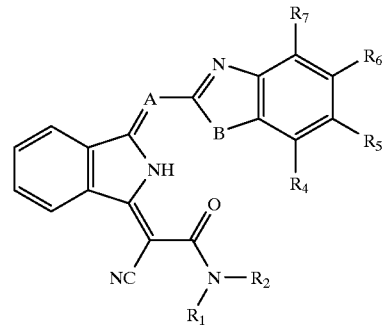

(VII)

| Example | A | B | $R_1$ | $R_2$ | $R_4$ | $R_5$ | $R_6$ | $R_7$ | Shade |
|---|---|---|---|---|---|---|---|---|---|
| 16 | —N— | —S— | —CH$_2$CH$_3$ | —CH$_2$CH$_3$ | H | —OCH$_3$ | H | H | yellow-orange |
| 17 | —N— | —O— | —CH$_2$CH$_3$ | —CH$_2$CH$_3$ | H | H | H | H | greenish yellow |
| 18 | —N— | —O— | —CH$_2$CH$_3$ | —CH$_2$CH$_3$ | H | —CH$_3$ | H | H | greenish yellow |
| 19 | =C—CN | —NH— | —CH$_2$CH$_3$ | —CH$_2$CH$_3$ | H | H | H | H | fluorescent orange |
| 20 | —N— | —NH— | —CH$_2$CH$_3$ | —CH$_2$CH$_3$ | H | H | H | H | greenish yellow |
| 21 | =C—CN | —S— | —CH$_2$CH$_2$OCOCH$_3$ | —CH$_2$CH$_3$ | H | H | H | H | fluorescent yellow |
| 22 | =C—CN | —NH— | —CH$_2$CH$_2$OCOCH$_3$ | —CH$_2$CH$_3$ | H | H | H | H | fluorescent yellow |
| 23 | —N— | —S— | —CH$_2$CH$_2$OCOCH$_3$ | —CH$_2$CH$_3$ | H | H | H | H | greenish yellow |
| 24 | —N— | —S— | —CH$_2$CH$_2$OCOCH$_3$ | —CH$_2$CH$_3$ | H | Cl | H | H | greenish yellow |
| 25 | =C—CN | —S— | —CH$_2$CH$_2$OCOCH$_3$ | —CH$_3$ | H | H | H | H | fluorescent yellow |
| 26 | =C—CN | —S— | —CH$_2$CH$_2$OCOCH$_3$ | —CH$_3$ | H | H | H | H | fluorescent yellow |
| 27 | —N— | —S— | —CH$_2$CH$_2$OCOCH$_3$ | —CH$_3$ | H | H | H | —OCH$_3$ | yellow-orange |
| 28 | —N— | —S— | —CH$_2$CH$_2$OCOCH$_3$ | —CH$_3$ | H | —OCH$_3$ | H | H | yellow-orange |
| 29 | —N— | —S— | —CH$_2$CH$_2$OCOCH$_3$ | —CH$_3$ | H | Cl | H | H | greenish yellow |
| 30 | =C—CN | —S— | —CH$_2$CH$_2$OCOCH$_3$ | —CH$_2$CH$_2$OCOCH$_3$ | H | H | H | H | fluorescent yellow |
| 31 | —N— | —S— | —CH$_2$CH$_2$OCOCH$_3$ | —CH$_2$CH$_2$OCOCH$_3$ | H | H | H | H | greenish yellow |
| 32 | —N— | —S— | —CH$_2$CH$_2$CH$_2$CH$_2$CH$_2$— | | H | H | H | H | greenish yellow |
| 33 | —N— | —NH— | —CH$_2$CH$_2$CH$_2$CH$_2$CH$_2$— | | H | H | H | H | greenish yellow |
| 34 | —N— | —O— | —CH$_2$CH$_2$CH$_2$CH$_2$CH$_2$— | | H | H | H | H | greenish yellow |
| 35 | —N— | —S— | —CH$_2$CH$_2$CH$_2$CH$_2$CH$_2$— | | H | —OCH$_3$ | H | H | yellow-orange |
| 36 | —N— | —S— | —CH$_2$CH$_2$CH$_2$CH$_2$CH$_2$— | | H | H | H | —OCH$_3$ | yellow-orange |
| 37 | —N— | —S— | —CH$_2$CH$_2$CH$_2$CH$_2$CH$_2$— | | H | —CH$_3$ | H | —CH$_3$ | yellow |
| 38 | =C—CN | —S— | —CH$_2$CH$_2$CH$_2$CH$_2$CH$_2$— | | H | H | —CH$_3$ | —CH$_3$ | yellow |
| 39 | =C—CN | —S— | —CH$_2$CH$_2$CH$_2$CH$_2$CH$_2$— | | H | —OCH$_2$CH$_3$ | H | H | fluorescent orange |
| 40 | —N— | —S— | —CH$_2$CH$_2$CH(CH$_3$)CH$_2$CH$_2$— | | H | H | H | H | greenish yellow |
| 41 | —N— | —S— | —CH$_2$CH$_2$CH(CH$_3$)CH$_2$CH$_2$— | | H | —OCH$_3$ | H | H | yellow |
| 42 | —N— | —O— | —CH$_2$CH$_2$CH(CH$_3$)CH$_2$CH$_2$— | | H | H | H | H | greenish yellow |
| 43 | =C—CN | —S— | —CH$_2$CH$_2$CH(CH$_3$)CH$_2$CH$_2$— | | H | H | H | H | fluorescent yellow |
| 44 | —N— | —NH— | —CH$_2$CH$_2$CH(CH$_3$)CH$_2$CH$_2$— | | H | H | H | H | greenish yellow |
| 45 | —N— | —S— | —CH$_2$CH(CH$_3$)CH$_2$CH$_2$CH$_2$— | | H | H | H | H | greenish yellow |
| 46 | —N— | —S— | —CH$_2$CH(CH$_3$)CH$_2$CH$_2$CH$_2$— | | H | —OCH$_3$ | H | H | yellow |
| 47 | —N— | —S— | —CH$_2$CH(CH$_3$)CH$_2$CH$_2$CH$_2$— | | H | Cl | H | H | greenish yellow |
| 48 | —N— | —S— | —(CH$_2$)$_2$CH$_3$ | H | H | H | H | H | greenish yellow |
| 49 | —N— | —S— | —(CH$_2$)$_9$CH$_3$ | H | H | H | H | H | greenish yellow |
| 50 | =C—CN | —S— | benzyl | —CH$_3$ | H | H | H | H | greenish yellow |
| 51 | =C—CN | —S— | cyclohexyl | —CH$_3$ | H | H | H | H | greenish yellow |

I claim:
1. A compound of the formula (I)

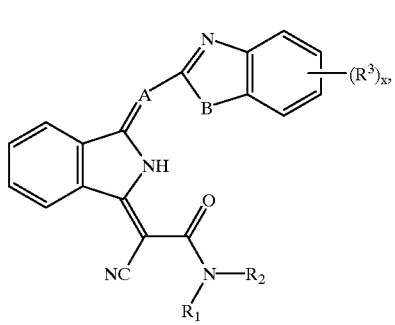

in which
- A represents N or a cyanomethylene radical,
- B represents S, O or NH,
- $R_1$ represents a saturated or unsaturated aliphatic radical having 1 to 12 C atoms, which is uninterrupted or interrupted by one oxygen atom and/or is unsubstituted or substituted by one or more identical or different substituents selected from the group consisting of alkoxy, acyloxy, halogen, CN and aryl,
- $R_2$ denotes hydrogen or aryl or adopts one of the meanings given for $R_1$, $R_1$ and $R_2$ being identical or different, or
- $R_1$ and $R_2$, together with the N atom to which they are bonded, form a heterocyclic ring,
- $R^3$ denotes halogen, $C_1$–$C_4$-alkyl, a saturated or unsaturated aliphatic alkoxy radical having 1 to 4 C atoms, which is unsubstituted or substituted by $C_1$–$C_4$-alkoxy, CN or $NO_2$, and
- x denotes a number from 0 to 4.

2. The compound according to claim 1, having the formula (I) or corresponding to tautomeric forms thereof in which
x represents 0 or 1.

3. The compound according to claim 1, having the formula (II) or corresponding to tautomeric forms thereof

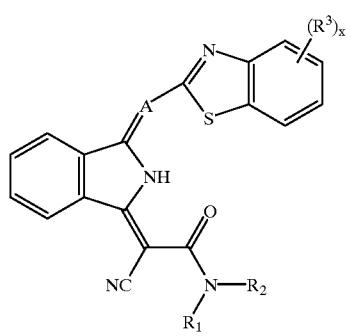

in which A, $R_1$ $R_2$ $R^3$ and x have tne meaning given in claim 1.

4. The compounds according to claim 1, having the formula (I) or corresponding to tautomeric forms thereof, in which $R^3$ represents chlorine, methyl, methoxy or ethoxy.

5. A process for preparing the compound according to claim 1, wherein a compound of the formula (III)

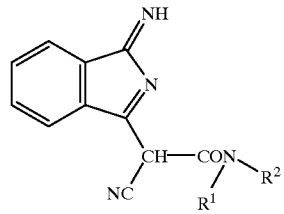

is condensed with a compound of the formula (IV)

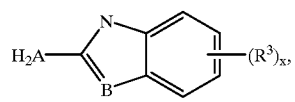

or an aminoisoindolenine of the formula (V)

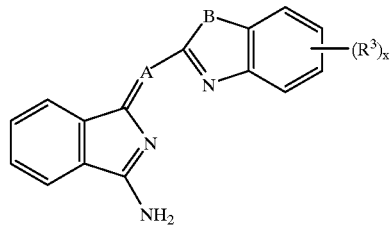

is condensed with a cyanoacetamide of the formula (VI)

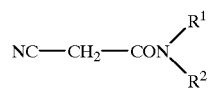

to give a compound of the formula (I)

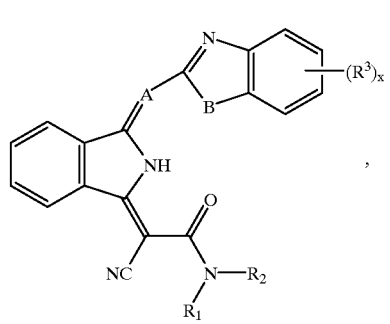

in which
- A represents N or a cyanomethylene radical,
- B represents S, O or NH,
- $R_1$ represents a saturated or unsaturated aliphatic radical having 1 to 12 C atoms, which is uninterrupted or interrupted by one oxygen atom and/or is unsubstituted or subsftilted by one or more identical or different substituents selected from the group consisting of alkoxy, acyloxy, halogen, CN and aryl, $R_2$ denotes hydrogen or aryl or adopts one of the meanings given for $R_1$, $R_1$ and $R_2$ being identical or different, or $R_1$ and $R_2$, together with the N atom to which they are bonded, form a heterocyclic ring, $R^3$ denotes halogen, $C_1$–$C_4$-alkyl, a saturated or unsaturated aliphatic alkoxy radical having 1 to 4 C atoms, which is unsubstituted or substituted by $C_1$–$C_4$-alkoxy, CN or $NO_2$, and x denotes a number from 0 to 4.

6. A process for dyeing or printing fully synthetic or semisynthetic high-molecular-weight materials, wherein the compound according to claim 1 is applied.

7. The process according to claim 6, wherein automotive cover fabrics are dyed or printed.

8. The compound as claimed in claim 1, wherein $R^3$ is Cl, F. Br, $C_1$–$C_4$-alkyl, $C_1$–$C_4$-alkoxy which is unsubstituted or substituted by a $C_1$–C4-alkoxy, CN or $NO_2$.

9. The process as claimed in claim 5, wherein $R^3$ is Cl, F, Br, $C_1$–$C_4$-alkyl, $C_1$–$C_4$-alkoxy which is unsubstituted or substituted by a $C_1$–$C_4$-alkoxy, CN or $NO_2$.

10. The compound as claimed in claim 1, wherein $R_2$ is an unsaturated aliphatic radical having one to twelve carbon atoms.

11. The compound as claimed in claim 10, wherein $R_2$ is an aliphatic radical having four carbon atoms.

12. The compound as claimed in claim 1, wherein $R_1$ is an unsubstituted aliphatic radical having from one to twelve carbon atoms.

13. The compound as claimed in claim 1, wherein $R_1$ is $CH_3$.

14. The compound as claimed in claim 11, wherein $R_1$ is $CH_3$.

15. The compound as claimed in claim 14, wherein B is S.

16. The compound as claimed in claim 14, wherein B is NH.

* * * * *